(12) United States Patent
Okumura et al.

(10) Patent No.: US 6,404,717 B1
(45) Date of Patent: Jun. 11, 2002

(54) OPTICAL REPRODUCING DEVICE AND OPTICAL MEMORY MEDIUM

(75) Inventors: Tetsuya Okumura, Tenri; Hiroshi Fuji, Soraku-gun; Shigemi Maeda, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/163,516

(22) Filed: Sep. 30, 1998

(30) Foreign Application Priority Data

Oct. 3, 1997 (JP) .............................................. 9-270691

(51) Int. Cl.$^7$ ................................................ G11B 5/09
(52) U.S. Cl. ................ 369/59.21; 369/59.2; 369/47.27; 369/47.28; 369/47.35
(58) Field of Search ...................... 369/54, 59, 124.05, 369/124.15, 44.34, 275.3, 47.27, 47.28, 47.39, 47.35, 47.53, 59.12, 59.19, 59.2, 59.21, 59.26

(56) References Cited

U.S. PATENT DOCUMENTS

| | | | | |
|---|---|---|---|---|
| 4,907,212 A | * | 3/1990 | Pharris et al. | ............ 369/44.26 |
| 5,537,381 A | * | 7/1996 | Fuji | ............................. 369/54 |
| 5,617,400 A | | 4/1997 | Fuji | ............................. 369/116 |
| 5,761,171 A | * | 6/1998 | Tabita | ...................... 369/59.18 |
| 6,125,085 A | * | 9/2000 | Fuji | ............................. 369/54 |

FOREIGN PATENT DOCUMENTS

| | | |
|---|---|---|
| EP | 0 709 837 A2 | 5/1996 |
| JP | 7-29238 | 1/1995 |

OTHER PUBLICATIONS

T. Okumura, et al. "A Study of Signal Amplitude Sampling Phase for Read Power Control Method" Electronic Data Transmission Association Symposium, p. 50, (1998) (partial translation).

H. Fuji, et al. "Read Power Control Method Using Feedback of the Signal Amplitude Ratio" In Abstracts of Papers Fifty–eighth Applied Physics Association Conference, p. 1131 (1997) (partial translation).

* cited by examiner

*Primary Examiner*—Thang V. Tran
(74) *Attorney, Agent, or Firm*—George W. Neuner; Edwards & Angell, LLP

(57) ABSTRACT

A magneto-optical disk reproducing device includes a clock producing circuit, which, on the basis of a reproducing signal from recorded marks recorded in a magneto-optical disk, produces a timing offset from peak positions of the reproducing signal; an A/D converter, which samples the reproducing signal in accordance with the timing, and outputs a reproducing signal quantity; and a short mark signal quantity averaging circuit and a long mark signal quantity averaging circuit, each of which averages a plurality of reproducing signal quantities. When projecting a light beam onto a magneto-optical disk, the magneto-optical disk reproducing device controls light quantity of the light beam on the basis of a ratio between the respective values outputted by the foregoing averaging circuits. By this means, the A/D converter is able to sample the reproducing signal at more timings than when a reproducing signal is detected at peak positions thereof, and the magneto-optical disk reproducing device can detect the foregoing ratio more precisely. Consequently, the magneto-optical disk can control the light quantity of the light beam more accurately.

16 Claims, 9 Drawing Sheets

6: SHORT MARK SIGNAL QUANTITY AVERAGING CIRCUIT

OPTICAL REPRODUCING DEVICE AND OPTICAL MEMORY MEDIUM

FIELD OF THE INVENTION

The present invention relates to an optical reproducing device, which projects a light beam onto an optical memory medium such as a magneto-optical disk which uses the magnetic ultra high resolution method, and which controls the quantity of light of the light beam so as to bring close to a predetermined value the quantity of a reproducing signal from recorded marks, and to an optical memory medium for use therein.

BACKGROUND OF THE INVENTION

Recent years have seen prolific development of high-density recording by means of magneto-optical disks which use the magnetic ultra high resolution method, provided with a recording layer and a reproducing layer. In magneto-optical disks of this type, a light beam is projected onto the reproducing layer of the disk, and in an area of the reproducing layer within the light beam spot which is heated to above a predetermined temperature (hereinafter referred to as the "aperture"), the magnetization of the recording layer is copied to the reproducing layer. Thus recorded marks smaller in diameter than the light beam spot can be reproduced.

In devices for reproducing magneto-optical disks of this type, even if the driving current for producing the light beam is held constant, there are cases in which the reproducing power of the light beam fluctuates with changes in the ambient temperature at the time of reproducing. If reproducing power is too strong, the aperture becomes too large, which increases crosstalk from reproducing signals from adjacent tracks, and reading errors occur. Again, if reproducing power is too weak, reproducing signal output from the target track is reduced, and again reading errors occur.

In a "Recording and Reproducing Device for Magneto-Optical Memory Medium and Magneto-Optical Memory Medium" disclosed in Japanese Unexamined Patent Publication No. 8-63817/1996 (Tokukaihei 8-63817) (U.S. Pat. No. 5,617,400), the aperture is maintained at a fixed size, and accurate data reproducing is performed, by reproducing a control pattern of repeated long marks and repeated short marks on a magneto-optical disk, and controlling reproducing light quantity so as to bring close to a predetermined value a ratio of the reproducing signal quantities of the two types of marks.

FIG. 11 explains the general structure of a magneto-optical disk reproducing device according to the foregoing conventional art. When projected light f' from a semiconductor laser 202 is projected onto a magneto-optical disk 212, reflected light g' from recorded marks for reproducing power control on the magneto-optical disk 212 is converted into a reproducing signal a' by a photodiode 203. The reproducing signal a' is sent to an A/D (Analog/Digital) converter 205 and to a clock producing circuit 204. By means of PLL (Phase Locked Loop), the clock producing circuit 204 produces a clock signal c' synchronized with the reproducing signal a'. Then, in accordance with the clock signal c', the A/D converter 205 converts the reproducing signal a' into digital data d'. On the basis of the digital data d' sampled according to the clock signal c', an amplitude ratio detecting circuit 213 calculates and outputs a ratio between an amplitude of the reproducing signal a' of the long marks and an amplitude of the recording signal a' of the short marks (amplitude ratio r'). A differential amplifier 210 then compares the amplitude ratio r' with a standard value, producing a difference e' therebetween. A reproducing light quantity control circuit 211 then outputs a driving current i' for the semiconductor laser 202 in such a way that feedback reduces the difference e', thus controlling the driving current i' of the laser light in such a manner that an optimum reproducing light quantity is always applied.

However, in calculating the amplitude of the reproducing signal a' from each type of mark, the amplitude ratio detecting circuit 213 calculates the amplitude based on digital data d' sampled at a single upper peak position and digital data d' sampled at a single lower peak position. Accordingly, it is difficult to improve the precision of the amplitude, and the precision of the amplitude ratio r' calculated from the respective amplitudes may also be impaired. This results in the problem that accurate control of reproducing light quantity is difficult.

Here, sufficiently precise control of the reproducing light quantity is particularly necessary when using the foregoing magnetic ultra high resolution magneto-optical disks, because of their high recording density. Again, since the short marks are set to be shorter than the long marks, the reproducing signal a' from the short marks has a smaller amplitude, and fluctuates with a shorter cycle, than the reproducing signal a' from the long marks. Consequently, it is particularly difficult to improve the precision of the amplitude of the short marks.

SUMMARY OF THE INVENTION

It is an object of the present invention to provide an optical reproducing device and an optical memory medium which are capable of precisely detecting the amplitude of a reproducing signal from recorded marks.

In order to attain the foregoing object, an optical reproducing device according to the present invention includes a reproducing signal producing section, which outputs a reproducing signal obtained from recorded marks recorded in an optical memory medium; a signal quantity detecting section, which samples the reproducing signal at indicated sampling points, and outputs a reproducing signal quantity; a timing producing section, which indicates to the signal quantity detecting section sampling points having a phase offset from peak positions of the reproducing signal; and an amplitude calculating section, which, based on a plurality of the reproducing signal quantities, outputs an amplitude signal showing the amplitude of the reproducing signal.

With the foregoing structure, the reproducing signal from the recorded marks is sampled with a phase offset from peak positions of the reproducing signal, and the amplitude calculating section outputs an amplitude signal based on a plurality of reproducing signal quantities. Accordingly, an amplitude signal can be produced more precisely than when an amplitude signal is produced on the basis of reproducing signal quantities sampled from a reproducing signal only at peak positions within each period thereof.

Further, since the sampling points are not limited to peak positions, the timing producing section can indicate sampling points (for example at shoulder portions of the reproducing signal) with a timing suited to production of the amplitude signal. Accordingly, precision of the amplitude signal can be improved even in comparison with a case of averaging a plurality of reproducing signal quantities sampled only at peak positions.

In addition, in order to improve the precision of the amplitude signal, it is preferable to produce the amplitude signal based on reproducing signal quantities obtained from a plurality of periods of the reproducing signal, or to make more samplings per period of the recorded marks.

In addition to the foregoing structure, it is preferable if the sampling points indicated by the timing producing section are sampling points offset to precede upper or lower peak positions of the reproducing signal, and sampling points offset to follow upper or lower peak positions of the reproducing signal.

With this structure, even if the phase indicated by the timing producing section for use as the sampling points differs somewhat from the most suitable sampling points, the variation in the preceding and following sampling points creates fluctuations in the amplitude signal in mutually opposite directions, which thus cancel each other out. Consequently, even if the instructions of the timing producing section include error, the amplitude calculating section can produce a precise amplitude signal. Moreover, if the preceding and following sampling points are set an equal interval from the upper or lower peak positions, fluctuations in the amplitude signal due to variation in the preceding and following sampling points will also be substantially equal, thus further improving precision.

Incidentally, the peak positions on which the preceding and following sampling points are based may mutually differ; for example, the preceding sampling points may precede upper peak positions while the following sampling points follow lower peak positions. In such a case, precision of the amplitude signal can be improved without much increase in power consumption. Moreover, if sampling points are set preceding and following each peak position, the number of sampling points per period of the recorded marks can be increased, thus further improving precision of the amplitude signal.

In addition, the timing producing section may indicate sampling points with a frequency of four times the frequency of the recorded marks. In this case, the timing producing section can indicate sampling points by means of a periodic clock signal, and accordingly circuit structure of the timing producing section and the reproducing signal producing section can be simplified. Further, since there are no unnecessary reproducing signal quantities even if sampling is performed in synchronization with a clock signal, circuit structure of the amplitude calculating section can be made simpler than in a case where the reproducing signal producing section outputs unnecessary reproducing signal quantities.

Further, in addition to the foregoing structures, it is preferable to provide the optical reproducing device with a control section, which, on the basis of the amplitude signal, controls light quantity of a light beam projected onto the optical memory medium during reproducing of data therefrom by the reproducing signal producing section. With this structure, since the control section controls the light quantity of the light beam on the basis of a precise amplitude signal, the light quantity can be controlled precisely, and errors during reproducing can be decreased.

In addition, if the timing producing section is able to indicate sampling points with a phase differing from the peak positions of the reproducing signal of the recorded marks, the timing producing section may determine the timing from the reproducing signal of the recorded marks. In this case, in particular, sampling points may be indicated without changing the optical memory medium. Alternatively, the timing producing section may determine the timing from clock marks previously recorded in the optical memory medium. In this case, circuit structure of the timing producing section can be made simpler than in a case where the timing producing section independently determines sampling points.

An optical memory medium according to the present invention is for use in an optical reproducing device which, on the basis of values sampled from a reproducing signal from recorded marks recorded in the optical memory medium, controls a reproducing light quantity during reproducing, and, in order to attain the foregoing object, includes a control domain, in which the recorded marks are recorded; and clock marks which express a timing, differing from peak positions of the reproducing signal from the recorded marks, at which sampling is to be performed by the optical reproducing device.

In the optical memory medium with the foregoing structure, the clock marks are previously recorded. Accordingly, the optical memory medium can indicate sampling points to the optical reproducing device more precisely than when the optical reproducing device independently detects sampling points. Consequently, the precision of the amplitude signal calculated by the optical reproducing device can be further improved.

The foregoing optical memory medium may be manufactured by simultaneously forming the clock marks and the recorded marks therein, or by previously forming clock marks therein, and then, while confirming the phase of the clock marks, forming the recorded marks therein.

In addition, it is preferable if the frequency of the clock marks is set to four times the frequency of the recorded marks. With this structure, only necessary sampling points are indicated, and the number of clock marks can be reduced. Further, since even an optical reproducing device of simple structure can detect the amplitude value with precision, the size of the control domain can be reduced. Consequently, the efficiency of use of the optical memory medium can be improved.

Incidentally, the foregoing optical reproducing device and optical memory medium are particularly suitable for use as an optical reproducing device and an optical memory medium which are expected to precisely detect the amplitude of the reproducing signal from the recorded marks. Examples of these are an optical memory medium which includes a recording layer, in which the recorded marks are magnetically recorded, and a reproducing layer laminated thereon, in which projection of a predetermined light beam forms an aperture within which recorded marks are copied to the reproducing layer, and an optical reproducing device for such an optical memory medium.

Additional objects, features, and strengths of the present invention will be made clear by the description below. Further, the advantages of the present invention will be evident from the following explanation in reference to the drawings.

DESCRIPTION OF THE EMBODIMENTS

EXAMPLE 1

Figure 1:
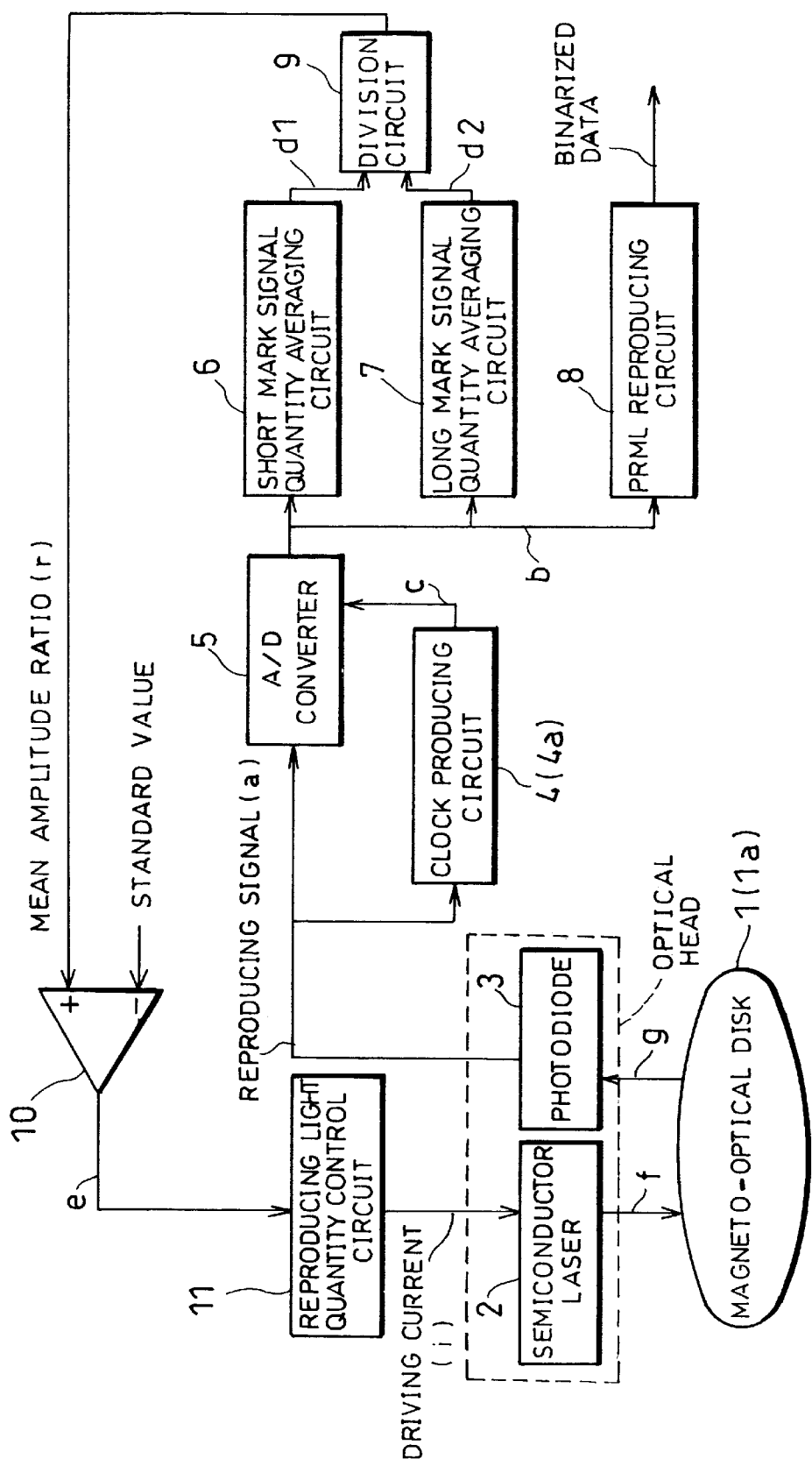
FIG. 1 is a structural drawing showing the chief members of a magneto-optical disk reproducing device according to Example 1 of the present invention.
Figure 2:
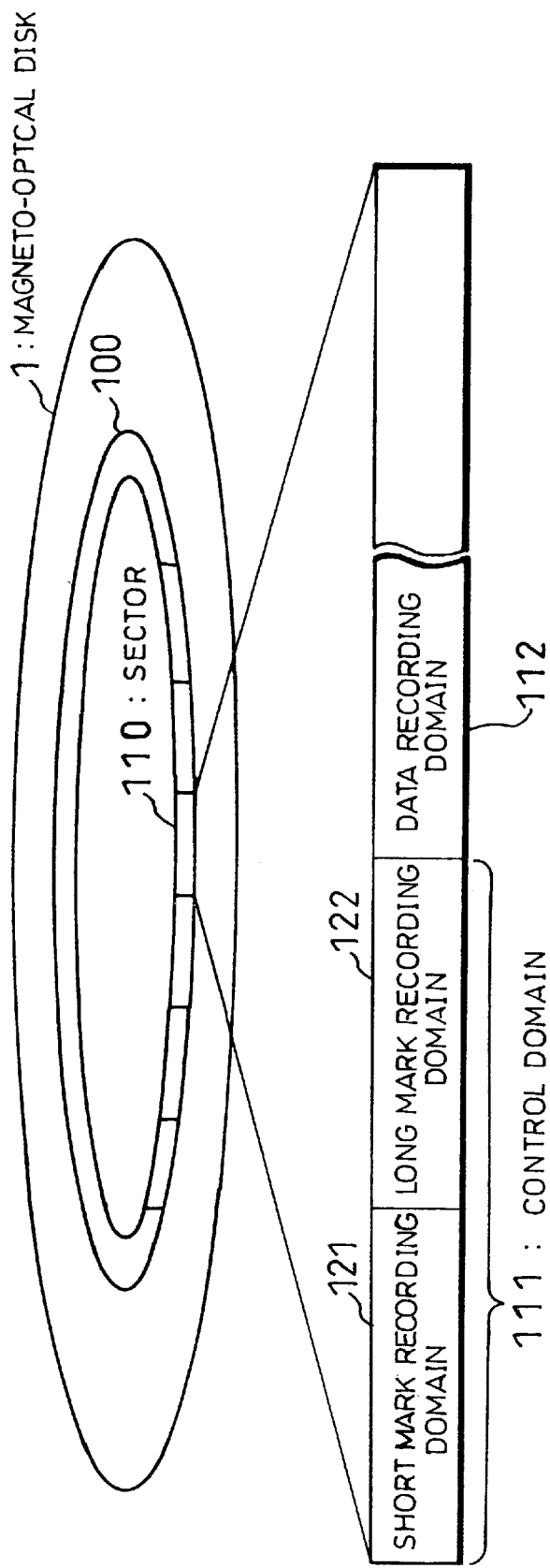
FIG. 2 is a schematic drawing explaining the sector structure of a magneto-optical disk to be reproduced by the foregoing magneto-optical disk reproducing device.

The present Example 1 will explain, with reference to FIGS. 1 through 9, application of the present invention to a magneto-optical disk reproducing device for reproducing magneto-optical disks which use the magnetic ultra high resolution method. For example, a magneto-optical disk 1, as shown in FIG. 2, is provided with tracks 100 in a previously determined shape such as concentric circles or a spiral, and each track 100 is provided with a plurality of sectors 110.

The magneto-optical disk 1 includes a recording layer, in which the recorded marks are recorded, and a reproducing layer laminated on the recording layer, and in reproducing data from a sector 110, a light beam is projected thereon from the reproducing layer side. By this means, in the reproducing layer, part of an area onto which the light beam is projected (spot) is heated to above a predetermined temperature, and within this part (aperture), the magnetization of the recording layer is copied to the reproducing layer. Accordingly, by reproducing the magnetization of the aperture, recorded marks smaller in diameter than the light beam spot can be reproduced.

In each sector 110 is provided a control domain 111, for controlling reproducing light quantity, and a data recording domain 112, in which data is recorded. The control domain 111 is provided with a short mark recording domain 121, in which is recorded a pattern of repeated short marks (hereinafter referred to as the "short mark pattern"), and a long mark recording domain 122, in which is recorded a pattern of repeated long marks (hereinafter referred to as the "long mark pattern").

Figure 3:
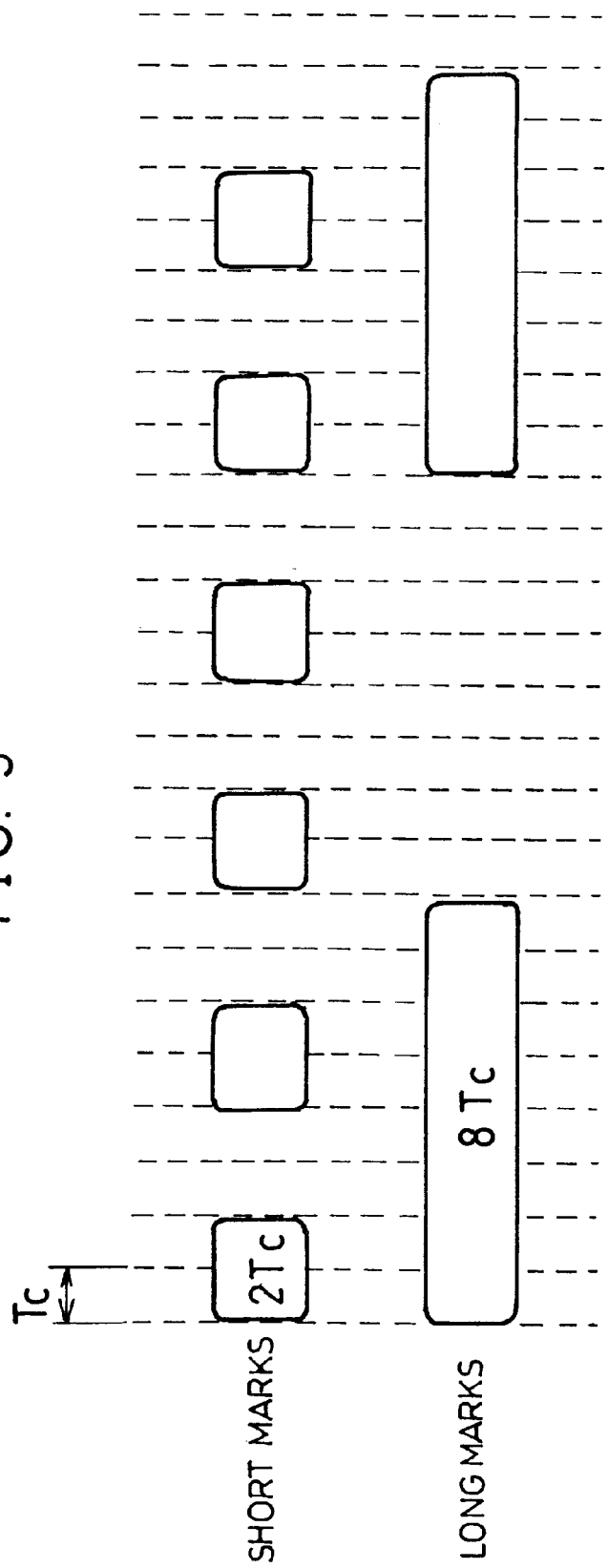
FIG. 3 is a schematic drawing explaining patterns of long and short marks in the foregoing magneto-optical disk.

FIG. 3 is a drawing explaining in detail the short mark pattern and the long mark pattern. The short mark pattern is a repeating pattern of short marks, each 2Tc in length (Tc being the channel bit length), alternating with spaces, each also 2Tc in length. The long mark pattern is a repeating pattern of long marks, each 8Tc in length, alternating with spaces, each also 8Tc in length. The length of a short mark is shorter than the diameter of the aperture in the reproducing layer produced by projection of the light beam, but the length of a long mark is longer than the diameter of the aperture.

As shown in FIG. 1, the magneto-optical disk reproducing device according to the present Example includes a semiconductor laser 2, which projects laser light onto the magneto-optical disk 1, and a photodiode 3, which converts reflected light g from the magneto-optical disk 1 into a reproducing signal a. These members are provided in an optical head, which can project the laser light (projected light f) onto a desired location in the plane of the magneto-optical disk 1.

Further, the magneto-optical disk reproducing device according to the present Example is also provided with a clock producing circuit 4, which produces a clock signal c, with a timing to be discussed below, on the basis of the reproducing signal a, and an A/D converter 5, which samples the reproducing signal a with the timing indicated by the clock signal c.

Further, instead of the amplitude ratio detecting circuit 213 of the conventional magneto-optical disk reproducing device, the present magneto-optical disk reproducing device is provided with a short mark signal quantity averaging circuit 6, which calculates a mean amplitude value d1 of the short mark pattern; a long mark signal quantity averaging circuit 7, which calculates a mean amplitude value d2 of the long mark pattern; and a division circuit 9, which outputs a mean amplitude ratio r between the output d1 of the short mark signal quantity averaging circuit 6 and the output d2 of the long mark signal quantity averaging circuit 7. In addition, a PRML reproducing circuit 8, which reproduces recorded data, is also provided.

Further, in order to control the reproducing light quantity so as to adjust the mean amplitude ratio r to a standard value, a differential amplifier 10, which compares the mean amplitude ratio r with the standard value, and a reproducing light quantity control circuit 11, which controls a driving current i of the semiconductor laser 2 on the basis of an output e from the differential amplifier 10, are also provided.

During detecting of a signal from the short marks, detecting of a signal from the long marks, and reproducing of data, the clock producing circuit 4 selectively outputs clock signals c having respective sampling phases suited to the operation being performed, thus indicating to the A/D converter 5 sampling points suited to the operation being performed. Accordingly, during reproducing of data, the A/D converter 5 samples the reproducing signal a with a phase suited to PRML reproducing, and, during detecting of the signal from the long marks, with the same phase as that used with the long marks, which is a phase suited to detecting the signal of the long marks.

During detecting of the signal from the short marks, the clock producing circuit 4 indicates to the A/D converter 5 sampling points with a phase which is offset from peak positions of the reproducing signal a of the short marks (a phase preceding or following the peak positions by Tc×(½), for example). In this way, the short mark signal quantity averaging circuit 6 averages signal quantities at a phase which is always offset from the peak positions of the reproducing signal a of the short marks.

Here, the relationship between the sampling points suited to data reproducing and the peak positions of the reproducing signal a from the short marks differs according to the modulation method used in recording the data, the PRML reproducing method used, etc. Accordingly, the clock signal c is selected according to the modulation method used, the PRML reproducing method used, etc. For example, with (1,7)RLL modulation and PR(1,2,1) reproducing, the sampling points suited to data reproducing are offset from the peak positions of the reproducing signal a from the short marks. Accordingly, the clock signal producing circuit 4 provides a clock signal c during detecting of the signal of the short marks which has the same phase as the clock signal c used in data reproducing. With NRZI modulation and PR(1, 1) reproducing, however, if the reproducing signal a of the short marks is sampled at the sampling points suited to data reproducing, the reproducing signal a is sampled at the peak positions thereof. Accordingly, the clock producing circuit 4 selects and outputs a clock signal c having a phase different from the clock signal c used in data reproducing. Incidentally, the clock producing circuit 4 may also be structured so as to switch the foregoing operations according to the modulation method, reproducing method, etc.

In FIG. 1, projected light f from the semiconductor laser 2 accesses the sector 110 of the magneto-optical disk 1 shown in FIG. 2, and is first projected onto the short mark recording domain 121. Reflected light g from the short mark recording domain 121 is converted into a reproducing signal a by the photodiode 3 shown in FIG. 1. The reproducing signal a is sent to the clock producing circuit 4 and to the A/D converter 5. The clock producing circuit 4 produces a clock signal c synchronized with the channel bit frequency of the reproducing signal a. The A/D converter 5, on the basis of the clock signal c produced by the clock producing circuit 4, converts the reproducing signal a into a digital signal b, which is sent to the short mark signal quantity averaging circuit 6, the long mark signal quantity averaging circuit 7, and the PRML reproducing circuit 8.

Here, as discussed above, during detecting of the signal of the short marks, the clock producing circuit 4 causes the A/D converter 5 to sample the reproducing signal a with a phase differing from the peak positions thereof. Consequently, the short mark signal quantity averaging circuit 6 outputs a short mark amplitude value d1 by averaging a plurality of signal quantities offset from the peak positions of the reproducing signal a of the short marks.

The projected light f is next projected onto the long mark recording domain 122 shown in FIG. 2, and, by means of processing equivalent to that in the case of the short marks, a long mark amplitude value d2 is outputted from the long mark signal quantity averaging circuit 7. The division circuit 9 receives the short mark amplitude value d1 and the long mark amplitude value d2, calculates a ratio therebetween, and outputs this ratio as a mean amplitude ratio r. The differential amplifier 10 compares the outputted mean amplitude ratio r with a standard value, producing a difference e therebetween. The reproducing light quantity control circuit 11 then outputs a driving current i to the semiconductor laser 2 in such a way that feedback reduces the difference e.

After controlling the driving current i of the laser light in this way, so as to apply an optimum reproducing light quantity, the projected light f is projected onto the data recording domain 112 shown in FIG. 2, and the reproducing signal a read therefrom is sent through the A/D converter 5 and inputted to the PRML reproducing circuit 8. Here, the clock producing circuit 4 outputs a clock signal c which is suited to data reproducing. In this state, the light quantity of the laser light is adjusted to an optimum value in accordance with changes in ambient temperature, etc., thus enabling the PRML reproducing circuit 8 to reproduce the data with few errors. Then, when the projected light f reaches the next sector, the foregoing processing is repeated, and a new optimum reproducing light quantity is set.

Next, the phase for sampling of the short mark pattern and the long mark pattern by the A/D converter 5 will be explained with reference to FIG. 4. When detecting the signal of the short marks, if the A/D converter 5 samples the reproducing signal a according to the clock signal c, the signal quantities obtained are a signal quantity ($ds_{4i}$) at a sampling point with a phase preceding an upper peak position of the short mark reproducing signal, a signal quantity ($ds_{4i+1}$) at a sampling point with a phase following the upper peak position, a signal quantity ($ds_{4i+2}$) at a sampling point with a phase preceding a lower peak position, and a signal quantity ($ds_{4i+3}$) at a sampling point with a phase following the lower peak position. In the Figure, these sampling points are shown by small circles. The A/D converter 5 repeatedly detects these four signal quantities (sampling data), and the short mark signal quantity averaging circuit 6 averages a plurality of these signal quantities to calculate a mean signal quantity for the short marks. In the present Example, the short mark pattern is set so that the frequency of the clock signal c is four times the frequency of repetition of the short marks. In this way, the sampled signal quantities can be used without waste for signal quantity detecting, as will be discussed below.

Figure 5:
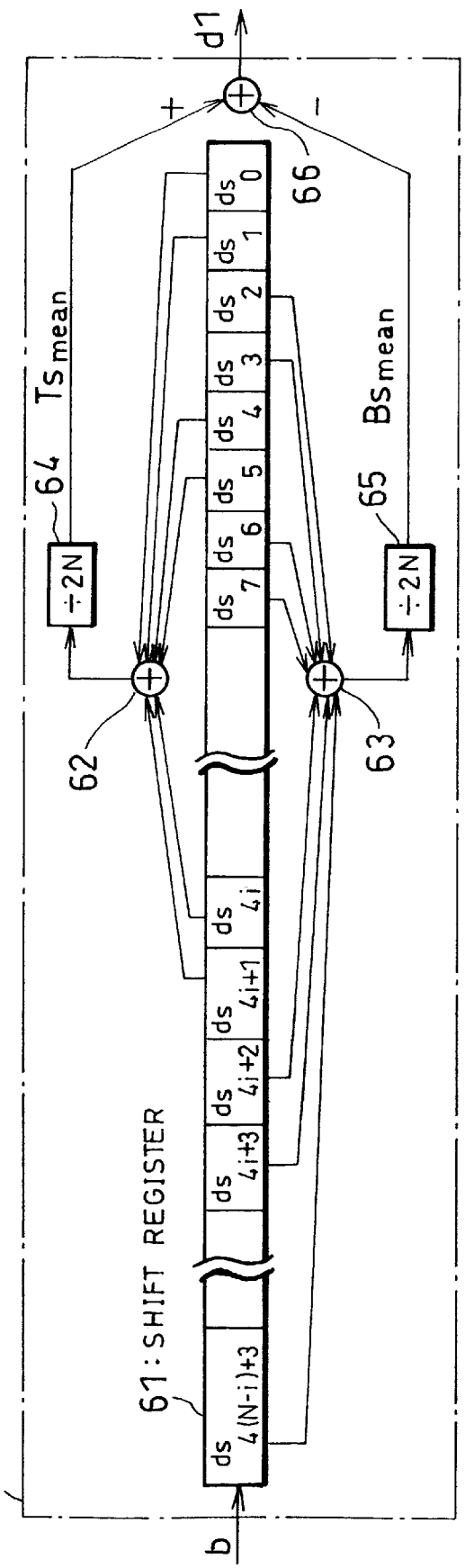
FIG. 5 is a structural drawing showing the detailed structure of the short mark signal quantity averaging circuit of the foregoing magneto-optical disk reproducing device.

FIG. 5 shows the detailed structure of the short mark signal quantity averaging circuit 6. The short mark signal quantities $ds_0, ds_1, ds_2, ds_3, \ldots, d_{4i}, ds_{4i+1}, ds_{4i+2}, ds_{4i+3}, \ldots$ sampled at each clock are inputted and stored in order in a shift register 61 of 4N stages. Signal quantities for two consecutive upper sampling points are inputted for every four-sampling-point period of the short marks. Accordingly, digital values ($ds_0, ds_1, ds_4, ds_5, \ldots, ds_{4(N-1)}, ds_{4(N-1)+1}$) for these upper sampling points are added by an addition circuit 62, and then a division circuit 64 divides this sum by 2N, obtaining a mean value $Ts_{mean}$ for the upper sampling points. In the same way, digital values ($ds_2, ds_3, ds_6, ds_7, \ldots, ds_{4(N-1)+2}, ds_{4(N-1)+3}$) for the two remaining sampling points of the four-sampling-point period are added by an addition circuit 63, and then a division circuit 65 divides this sum by 2N, obtaining a mean value $Bs_{mean}$ for the lower sampling points. A subtraction circuit 66 finds a difference between the two mean values ($Ts_{mean}-Bs_{mean}$), and outputs this difference as the mean amplitude value d1 for the short marks. In this way, since all of the sampled signal quantities are used in averaging processing, the mean amplitude value d1 can be calculated at high speed and without waste.

Figure 4:
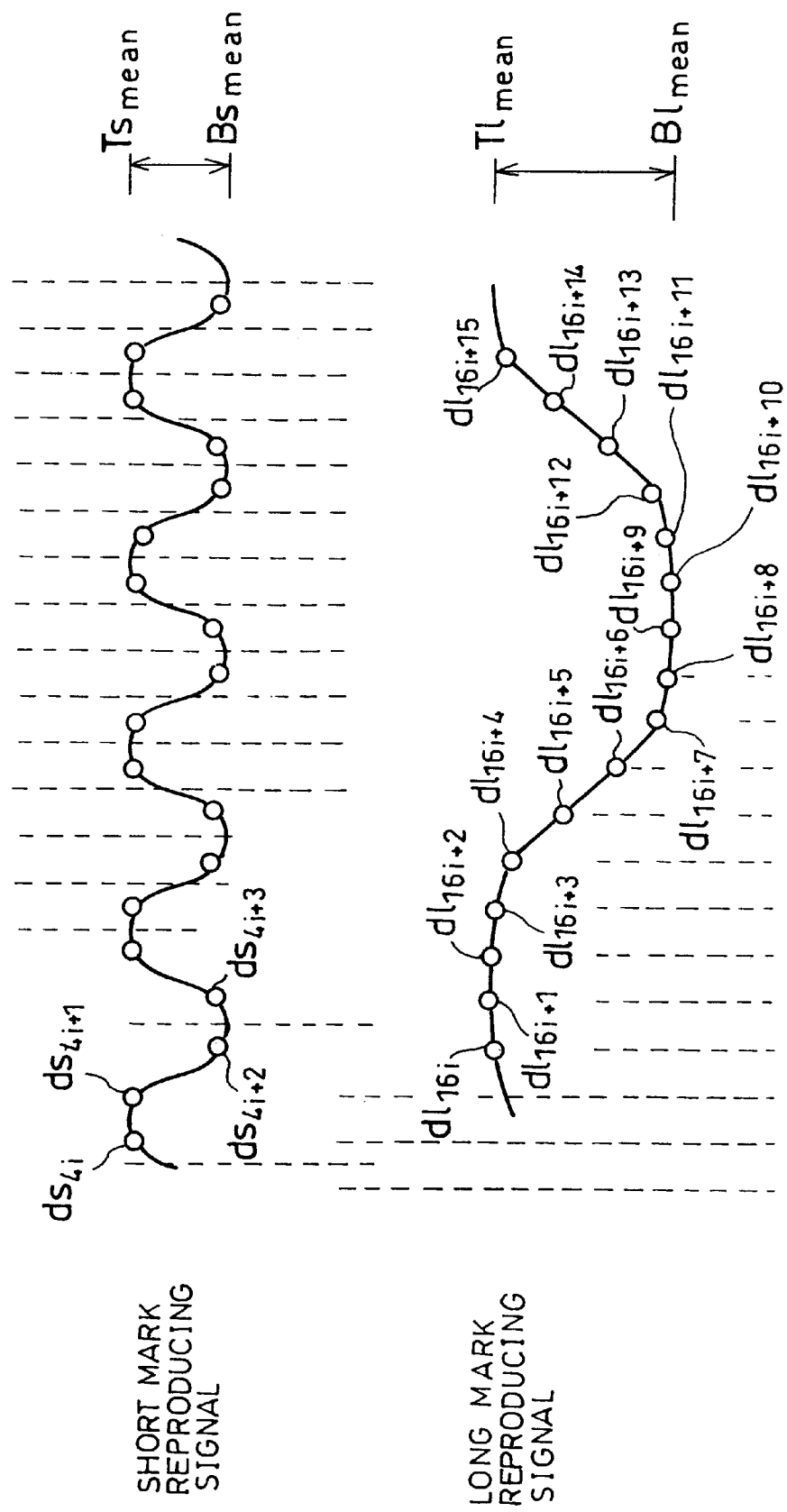
FIG. 4 is a schematic drawing explaining points for sampling reproducing signals of long and short marks during reproducing of a magneto-optical disk by the foregoing magneto-optical disk reproducing device.

When detecting the signal of the long marks, on the other hand, if the A/D converter 5 samples the reproducing signal a according to the clock signal c, as shown in FIG. 4, the signal quantities obtained are signal quantities ($dl_{16i}, dl_{16i+1}, dl_{16i+2}, dl_{16i+3}$) at four upper envelope sampling points, signal quantities ($dl_{16i+4}, dl_{16i+5}, dl_{16i+6}, dl_{16i+7}$) at four intermediate level sampling points, signal quantities ($dl_{16i+8}, dl_{16i+9}, dl_{16i+10}, dl_{16i+11}$) at four lower envelope sampling points, and signal quantities ($dl_{16i+12}, dl_{16i+13}, dl_{16i+14}, dl_{16i+15}$) at four intermediate level sampling points. In the Figure, these sampling points are shown by small circles. Here, when the (1,7)RLL modulation method and the PR(1, 2,1) reproducing method are used, the sampling phases for the long marks and for the short marks are the same, but when the NRZI modulation method and the PR(1,1) reproducing method are used, the sampling phase differs for long and short marks.

The device structure of the long mark signal quantity averaging circuit 7 is equivalent to that of the short mark signal quantity averaging circuit 6 shown in FIG. 5. Accordingly, explanation of the structure thereof will be omitted, and only the calculation method will be explained here. In FIG. 4, signal quantities ($dl_0$, $dl_1$, $dl_2$, $dl_3$, . . . ) for the upper envelope sampling points of the long marks are averaged to calculate a mean value $Tl_{mean}$ for the upper envelope sampling points. In the same way, signal quantities ($dl_8$, $dl_9$, $dl_{10}$, $dl_{11}$, . . . ) for the lower envelope sampling points are averaged to calculate a mean value $Bl_{mean}$ for the lower envelope points. A difference between the two mean values ($Tl_{mean}-Bl_{mean}$) is outputted as the mean amplitude value d2 for the long marks.

Figure 6:
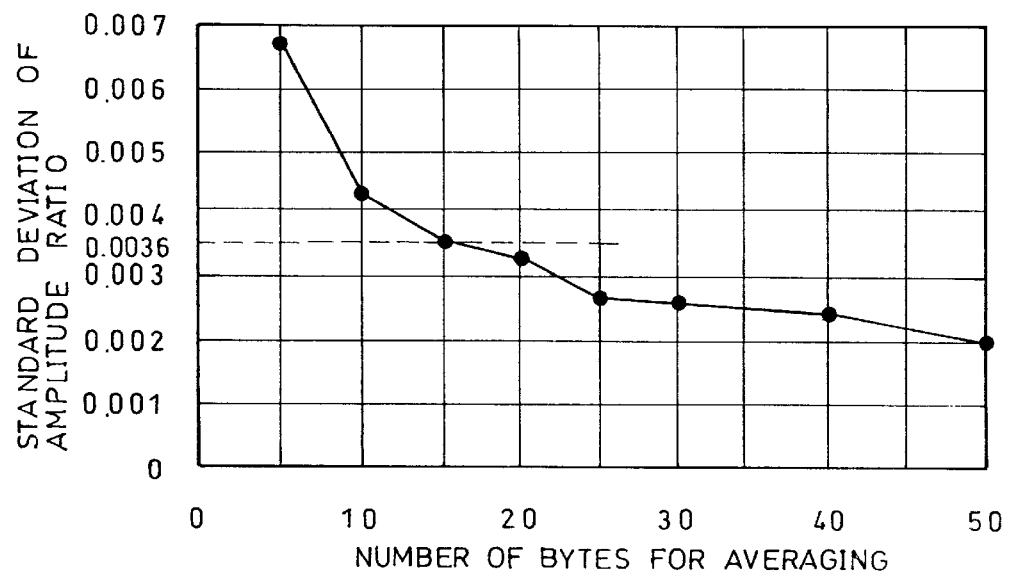
FIG. 6 is a graph showing the results of measurement of standard deviation of amplitude ratio by number of bytes for averaging in the foregoing magneto-optical disk reproducing device.

The precision of the amplitude ratio $r=(Ts_{mean}-Bs_{mean})/(Tl_{mean}-Bl_{mean})$ detected in this way is improved the greater the number of samples (4N). On the other hand, when sampling signal quantities of the short mark and long mark patterns in the control domain 111 provided on the magneto-optical disk 1, the greater the number of samples (4N), the greater the number of bytes of the control domain 111 (number of bytes for averaging). In FIG. 6, the precision of measured amplitude ratio by number of bytes for averaging K is shown by standard deviation.

Figure 7:
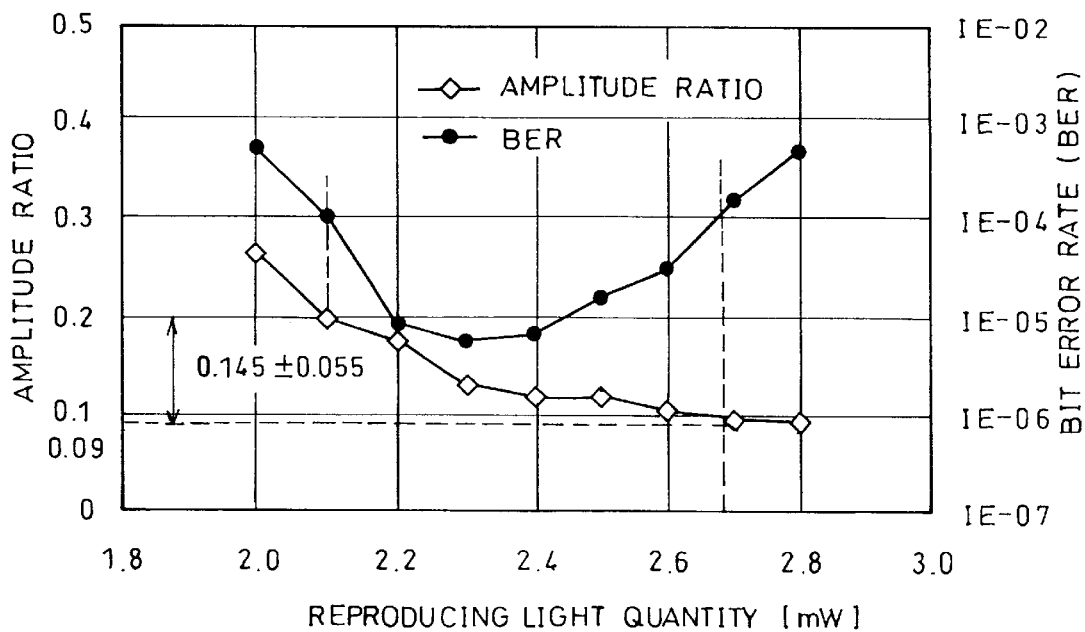
FIG. 7 is a graph showing the results of measurement of bit error rate of reproduced data by semiconductor laser reproducing light quantity, and of amplitude ratio of long and short marks by semiconductor laser reproducing light quantity, in the foregoing magneto-optical disk reproducing device.

FIG. 7 shows measured values for bit error rate (BER) of reproduced data by reproducing light quantity of the semiconductor laser 2, and for amplitude ratio of the long and short marks by reproducing light quantity of the semiconductor laser 2. According to the error correction ability of error correction processing circuits generally used in magneto-optical disk reproducing devices, the maximum correctable bit error rate is 1E-4 ($1\times10^{-4}$). In FIG. 7, the bit error rate is not more than 1E-4 when the amplitude ratio is within a range from 0.09 through 0.20. Expressed in the form of a median and tolerance, errors are correctable when the amplitude ratio is 0.145±0.055.

The following will explain a case in which the precision of reproducing light quantity after control is held to within ±20% of the correctable range with respect to the optimum amplitude ratio (0.145). This range of precision, when expressed in terms of the amplitude ratio, is ±0.055 (correctable range)×0.2=±0.011. Accordingly, it is necessary to set the number of samples 4N (and the number of bytes in the control domain 111) so that unevenness in the amplitude ratios averaged from every 4N samples is held to within the foregoing range. If the distribution of unevenness in amplitude ratio is assumed to be a normal distribution, then 99.7% of the measured values of the amplitude ratio will fall within an amplitude value range of three times the standard deviation. In other words, in order for the precision of the mean amplitude ratio to fall within ±0.011 with a probability of 99.7%, the standard deviation must be 0.0036 (0.011/3) or less. In the example in FIG. 6, this means that, when the number of bytes for averaging is 15 bytes or more, reproducing light quantity can be controlled within a range in which errors are correctable.

Figure 8:
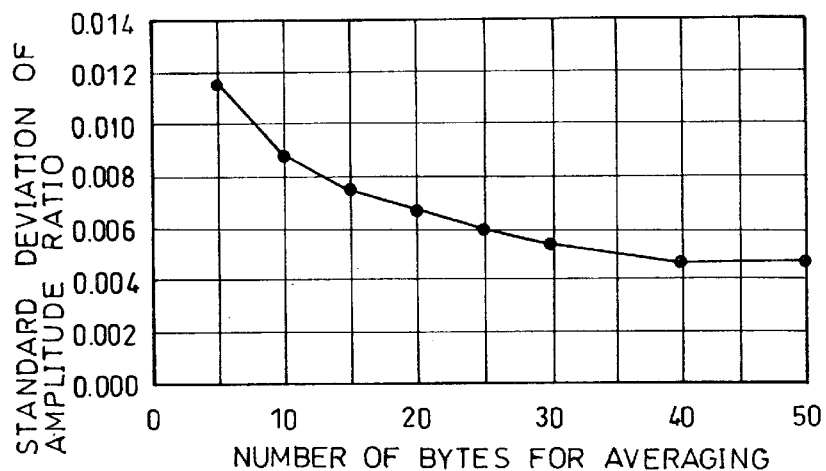
FIG. 8 is a graph showing the results of measurement of standard deviation of amplitude ratio by number of bytes for averaging in a conventional magneto-optical disk reproducing device.
Figure 9:
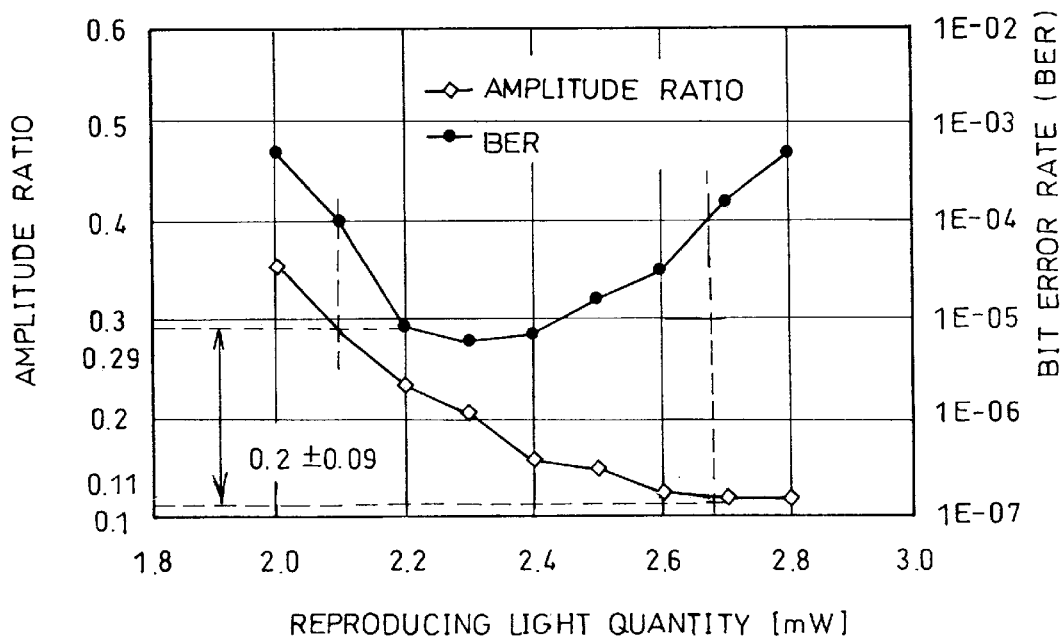
FIG. 9 is a graph showing the results of measurement of bit error rate of reproduced data by reproducing light quantity, and of amplitude ratio of long and short marks by reproducing light quantity, in a conventional magneto-optical disk reproducing device.

With conventional sampling of peak positions of the reproducing signal, in contrast, measured values for precision of amplitude ratio by number of bytes for averaging are as shown in FIG. 8, and measured values for bit error rate (BER) of reproduced data by reproducing light quantity, and for amplitude ratio of long and short marks by reproducing light quantity, are as shown in FIG. 9. In FIG. 9, in order to hold the control error within ±20% with respect to the amplitude ratio range of 0.2±0.09 necessary to keep the bit error rate below 1E-4 (as above), the standard deviation must be 0.006 (0.018/3) or less. Accordingly, it can be seen from FIG. 8 that, in this case, the required number of bytes for averaging is approximately 25 bytes.

Thus, sampling the reproducing signal a at points offset from peak positions can reduce the number of bytes for averaging necessary to obtain a predetermined precision. Accordingly, the control domain 111 can be made smaller, thus improving the efficiency of use of the memory medium (the magneto-optical disk 1). In other words, with the same number of bytes for averaging, reproducing light quantity can be controlled more precisely.

Further, in calculating the amplitude ratio r from signal quantities at a plurality of sampling points, if the reproducing signal a of the short marks is sampled at peak positions, and the digital signals d obtained thereby are averaged, the precision of the amplitude ratio r is not improved, and accurate control of the reproducing light quantity may be difficult. However, in the present Example, since sampling is performed at positions offset from peak positions, reproducing light quantity can be performed more accurately than when averaging digital signals d sampled at peak positions.

Further, by producing in the clock producing circuit 4, as shown in FIG. 4, a clock signal c with a frequency of four times the frequency of repetition of the short marks, the amplitude value data (signal quantities) sampled for each clock signal c can be used without waste for processing for finding the mean amplitude ratio. Accordingly, the number of stages of the register in the short mark signal quantity averaging circuit 6 can be held to a minimum, enabling reduction of the size of the device as a whole.

Incidentally, the foregoing Example discussed a structure in which a predetermined number of amplitude value data are all inputted into the shift register 61, and then averaging processed, but there is no limitation to this structure. Another possible structure is one in which the inputted digital values, instead of being held in a shift register, are cumulatively added, and the total is then divided by the number of samples to find the mean. Further, in the foregoing Example, the amplitude ratio r is calculated on the basis of the value d1, found by dividing by the number of samples, but there is no limitation to this method. For example, the short mark signal quantity averaging circuit 6 may be structured so as to output a value which is a predetermined number of times greater than the value d1. By dividing by a number half as large as the number of samples, for example, a value twice as large as the value d1 can be outputted. Further, the value d2 outputted by the long mark signal quantity averaging circuit 7 may be increased in accordance with the number of samples made when detecting the signal of the short marks. Incidentally, if changes such as the foregoing change the output r from the division circuit 9, the standard value may be changed to a value in accordance with that change. Effects equivalent to those of the present Example can be obtained in either of the foregoing cases, provided that a plurality of reproducing signal quantities at a phase offset from peak positions of the reproducing signal are inputted, and that, based on these reproducing signal quantities, a signal expressing the amplitude (r) can be outputted.

EXAMPLE 2

Figure 10:
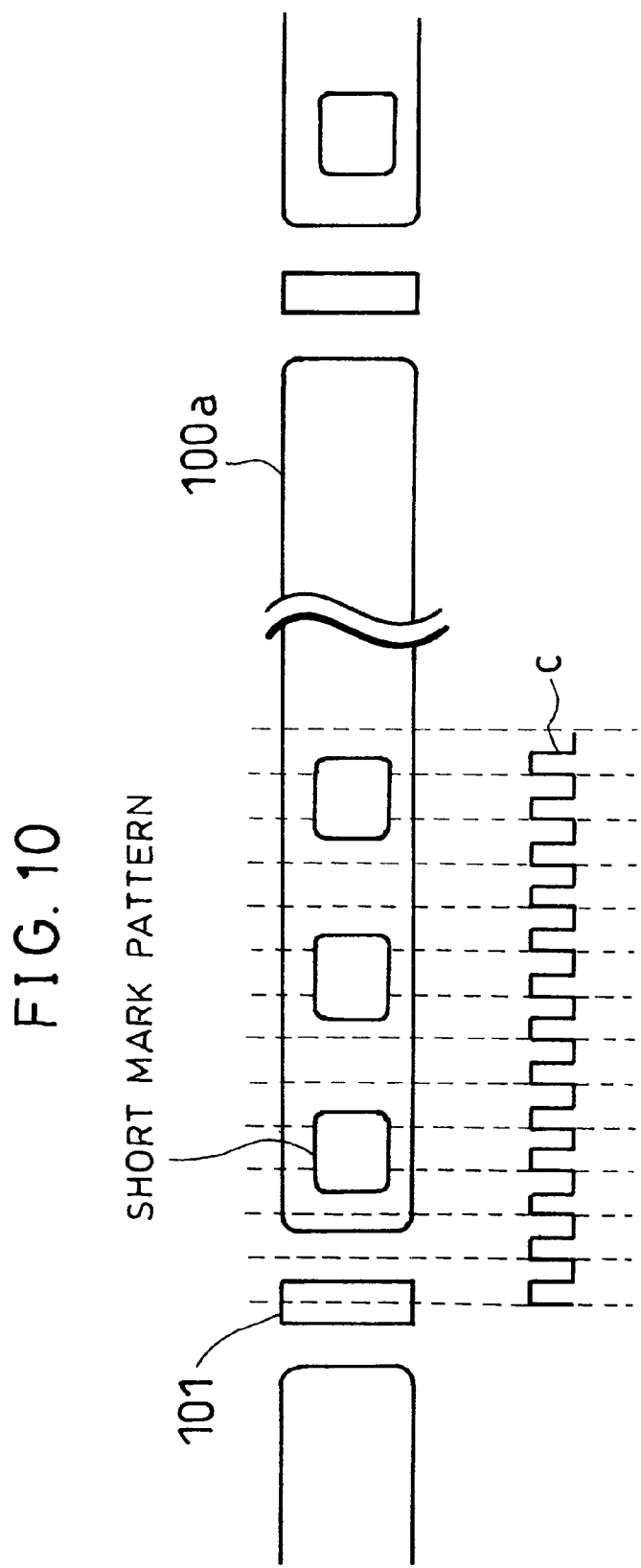
FIG. 10 is a drawing showing track format of a magneto-optical disk according to Example 2 of the present invention.
Figure 11:
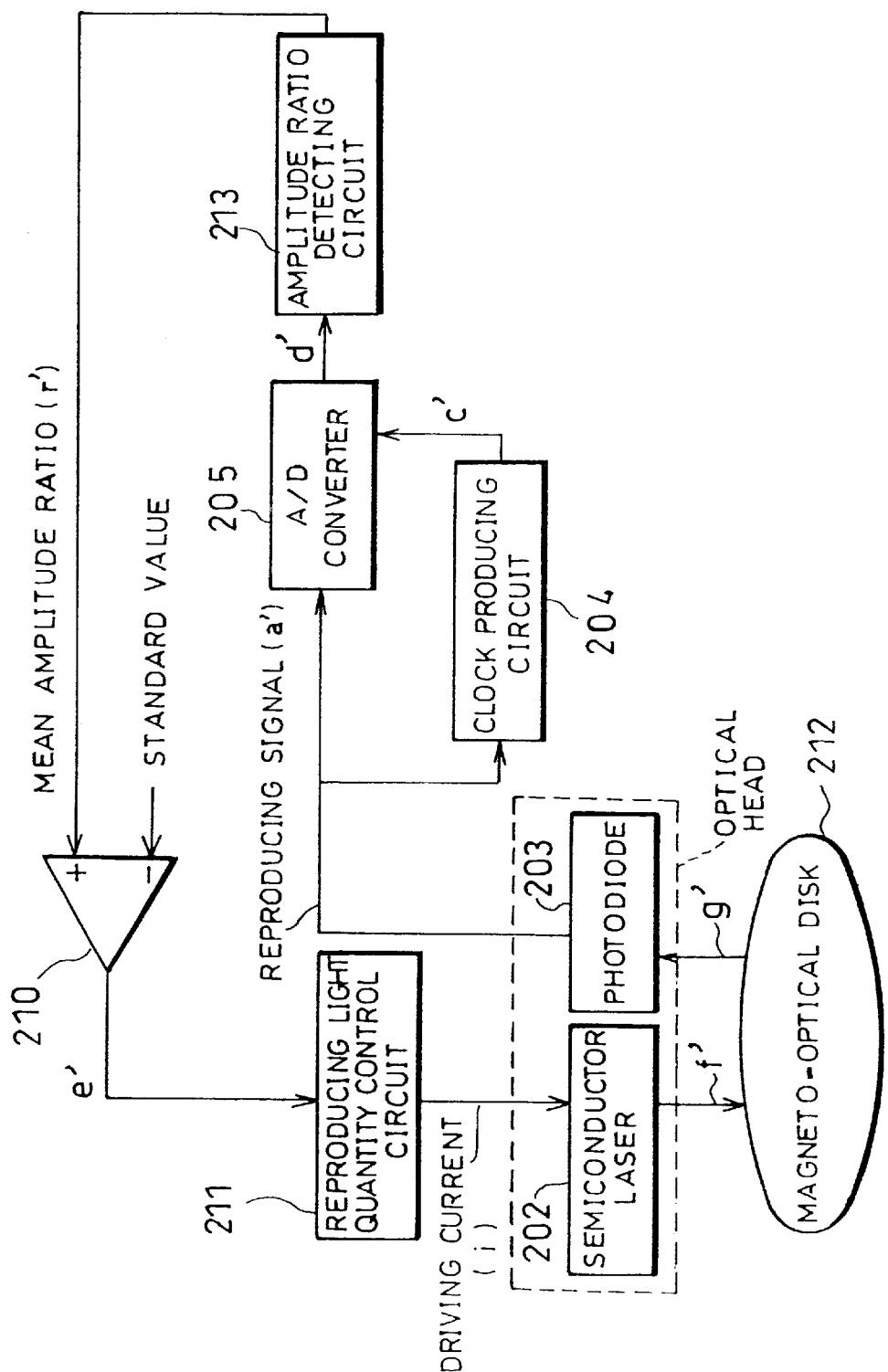
FIG. 11 is a structural drawing showing the chief members of a conventional magneto-optical disk reproducing device.

FIG. 10 shows the track format of a magneto-optical disk 1a according to the present Example 2. A track 100a, as in Example 1, is formed of a concave or convex guide groove, and in the track 100a, short mark patterns, long mark patterns, and data are recorded by magneto-optical recording. The magneto-optical disk 1a according to the present Example, unlike that of Example 1, is provided with clock marks 101, which periodically interrupt the track 100a.

Here, a recording device for the magneto-optical disk 1a, when recording the short marks in the short mark recording domain 121, detects the clock marks 101, determines therefrom a phase for recording the short marks, and records the short marks in the short mark recording domain 121 in such a way that sampling points based on the clock signal c produced from the clock marks 101 are offset from peak positions of the reproducing signal a of the short marks.

In a magneto-optical disk reproducing device for reproducing the magneto-optical disk 1a, the clock producing circuit 4a shown in FIG. 1 produces a clock signal c synchronized with the reproducing signal a from the clock marks 101. Since the clock marks 101 are non-erasable, a more stable clock signal c can be obtained than if, as in Example 1, clock signals c are produced on the basis of reproducing signals a from the short marks, the long marks, or marks showing the data. Consequently, the clock producing circuit 4 can indicate more suitable sampling points to the A/D converter 5, and the magneto-optical disk reproducing device can detect the signal quantities of the control patterns (the short and long mark patterns) with greater accuracy. In this way, control patterns recorded in one device can be accurately detected in another device using a clock signal c based on the clock marks 101, thus improving compatibility.

Further, by recording the repeating pattern of short marks in such a way that the frequency of the clock signal c is four times the frequency of repetition of the short marks, the sampled data can be used without waste. Consequently, the control domain 111 can be reduced in size, and the efficiency of use of the memory medium (the magneto-optical disk 1a) can be improved.

The interval at which the clock marks 101 are provided may be one for every sector 110, or one for every several sectors 110. Further, they may be provided within the sectors 110. However, if the interval between clock marks 101 is too short, recording density is impaired, and if too long, the precision of the clock signal c produced from the clock marks 101 is impaired. Accordingly, it is preferable to set an interval between the clock marks 101 which is as long as possible within a range at which it is possible to produce a clock signal c of a desired precision.

Incidentally, the foregoing Examples explained an example of a magneto-optical disk and magneto-optical disk reproducing device, but there is no limitation to these. The present invention can also be applied to optical cards, optical tape, and their reproducing devices. The present invention is particularly effective when applied to an optical memory medium which is expected to precisely detect the signal quantity of a reproducing signal of recorded marks, such as one which records a control pattern for controlling reproducing light quantity, and to a reproducing device for such an optical memory medium.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. An optical reproducing device comprising:

a reproducing signal producing section, which outputs a reproducing signal obtained from recorded marks recorded in an optical memory medium, said recorded marks including a short mark and a long mark longer than the short mark;

a signal quantity detecting section, which samples the reproducing signal at indicated sampling points, and outputs a reproducing signal quantity;

a timing producing section, which indicates to said signal quantity detecting section sampling points which are offset from peak positions of the reproducing signal;

an amplitude calculating section, which, based on a plurality of the reproducing signal quantities, outputs a short mark amplitude signal expressing the amplitude of the reproducing signal from the short mark;

a long mark amplitude calculating section, which outputs a long mark amplitude signal expressing of the amplitude of the reproducing signal from the long mark; and an amplitude ratio computing section, which, based on the short and long mark amplitude signals, computes an amplitude ratio of the amplitude of the reproducing signal from the short mark and the amplitude of the reproducing signal from the long mark.

2. The optical reproduction set forth in claim 1, wherein:

said amplitude calculating section and long mark amplitude calculating section outputs the short mark amplitude signal and the long mark amplitude signal on the basis of reproducing signal quantities in a plurality of periods of the recorded marks.

3. The optical reproducing device set forth in claim 1, wherein:

said timing producing section indicates a plurality of sampling points for each period of the recorded marks.

4. The optical reproducing device set forth in claim 1, wherein said timing producing section indicates as sampling points shoulder portions of the reproducing signal from the recorded marks.

5. The optical reproducing device set forth in claim 1, wherein said timing producing section indicates as sampling points preceding sampling points, which are offset so as to precede upper or lower peak positions of the reproducing signal, and following sampling points, which are offset so as to follow the upper or lower peak positions of the reproducing signal.

6. The optical reproducing device set forth in claim 5, wherein:

said timing producing section indicates the preceding and following sampling points such that an interval each preceding sampling point is offset from the upper or lower peak position is equal to an interval each following sampling point is offset from the upper or lower peak position.

7. The optical reproducing device set forth in claim 5, wherein:

said timing producing section indicates, as the preceding sampling points, upper preceding sampling points, which precede upper peak positions of the reproducing signal, and lower preceding sampling points, which precede lower peak positions of the reproducing signal; and said timing producing section indicates, as the following sampling points, upper following sampling points, which follow upper peak positions of the reproducing signal, and lower following sampling points, which follow lower peak positions of the reproducing signal.

8. The optical reproducing device set forth in claim 5, wherein:
said timing producing section indicates the sampling points with a frequency four times a frequency of the recorded marks.

9. The optical reproducing device set forth in claim 1, wherein
each of said amplitude calculating section and said long mark amplitude calculating section includes:
a reproducing signal quantity averaging section, which averages amplitudes of a plurality of the reproducing signal quantities.

10. The optical reproducing device set forth in claim 1, further comprising:
a control section, which, based on the amplitude signal, controls light quantity of a light beam projected onto the optical memory medium during reproducing of data therefrom by said reproducing signal producing section.

11. The optical reproducing device set forth in claim 1, wherein said reproducing signal producing section includes:
a light beam projecting section, which projects a light beam onto the optical memory medium having a recording layer in which the recorded marks are magnetically recorded and a reproducing layer to which the recorded marks are copied from the recording layer, and which produces in the recording layer an aperture of a size corresponding to light quantity of the light beam; and
a light receiving section, which, based on reflected light from the aperture, produces the reproducing signal corresponding to the recorded marks of the recording layer.

12. The optical reproducing device set forth in claim 11, wherein:
when said reproducing signal producing section outputs the reproducing signal from the short mark, said signal quantity detecting section outputs the reproducing signal quantity with a timing indicated by said timing producing section;
said optical reproducing device further comprises:
a control section, which, based on the amplitude ratio calculated in said amplitude ratio computing section, controls light quantity of the light beam projected onto the optical memory medium during reproducing of data therefrom by said reproducing signal producing section, such that the amplitude ratio is a predetermined value.

13. A method of controlling light quantity of a light beam projected onto an optical memory medium by an optical reproducing device, comprising the steps of:
(a) reproducing a predetermined control pattern previously recorded in the optical memory medium, the predetermined control pattern including a short mark and a long mark longer than the short mark;
(b) sampling a reproducing signal of the control pattern with a timing that is offset from peak positions of the reproducing signal to produce a plurality of reproducing signal quantities;
(c) calculating amplitude of a reproducing signal from the short mark based on the plurality of reproducing signal quantities;
(d) calculating amplitude of a reproducing signal from the long mark;
(e) calculating an amplitude ratio of the amplitude of the reproducing signal from the short mark and the amplitude of the reproducing signal from the long mark on the basis of the amplitude of the short and long marks; and
(f) controlling light quantity of the light beam on the basis of the amplitude ratio calculated in step (e), such that the amplitude ratio approaches a predetermined value.

14. The method of controlling light quantity of a light beam set forth in claim 13, wherein said step (a) includes the steps of:
(d) projecting the light beam onto the optical memory medium having a recording layer in which recorded marks are magnetically recorded in the control pattern and a reproducing layer to which the recorded marks are copied from the recording layer, thereby producing in the recording layer an aperture of a size corresponding to light quantity of the light beam; and
(e) receiving reflected light from the aperture, and producing, on the basis of the reflected light, the reproducing signal corresponding to the recorded marks.

15. The method of recording recorded marks in an optical memory medium in which are recorded clock marks, which indicate points to be sampled from a reproducing signal from the recorded marks during reproducing light quantity control, comprising the steps of:
(a) detecting the clock marks to determine a phase and produce sampling points; and
(b) recording the recorded marks based on the phase and reproducing signal from the recorded marks, wherein the peak positions of the reproducing signal are offset from the produced sampling point.

16. The method of recording recorded marks as set forth in claim 15, wherein:
in step (b), the recorded marks are recorded such that the sampling points indicated by the detected clock marks are offset from the peak positions of the reproducing signal from the recorded marks forward and backward by substantially equal interval.

* * * * *